United States Patent [19]

Gurewitsch

[11] 4,156,054
[45] May 22, 1979

[54] BONDED ASSEMBLY AND METHOD FOR OBTAINING SAME

[75] Inventor: Anatole M. Gurewitsch, Schenectady, N.Y.

[73] Assignee: Swiss Aluminium Limited, Chippis, Switzerland

[21] Appl. No.: 884,988

[22] Filed: Mar. 9, 1978

[51] Int. Cl.² .......................... B29C 19/00; B32B 3/02
[52] U.S. Cl. .................................... 428/583; 156/157; 156/304; 228/189; 428/57; 428/58; 428/77; 428/78; 428/189; 428/192; 428/458; 428/461; 428/463; 428/621; 428/626
[58] Field of Search ........................ 428/78, 58, 57, 60, 428/77, 50, 47, 53, 189, 191, 192, 583, 621, 626, 461, 463, 458; 156/304, 157; 228/189

[56] References Cited

U.S. PATENT DOCUMENTS

| | | | |
|---|---|---|---|
| 1,995,264 | 3/1935 | Mason | 428/192 |
| 2,679,305 | 5/1954 | Gunthrop | 428/189 |
| 3,108,925 | 10/1963 | Theilemann | 428/483 |
| 3,531,362 | 9/1970 | Bourns | 428/192 |
| 3,745,051 | 7/1973 | Griffin | 428/192 |
| 3,991,243 | 11/1976 | Biddell | 156/304 |
| 4,092,450 | 5/1978 | Haren | 428/58 |

*Primary Examiner*—Ellis P. Robinson
*Attorney, Agent, or Firm*—Bachman and LaPointe

[57] ABSTRACT

The disclosure teaches a method for joining metal-plastic laminates and a firmly bonded assembly prepared thereby. In accordance with the disclosed method, two sheet like metal-plastic laminates, each of which has at least one layered edge portion, are firmly bonded together at said edge portions.

21 Claims, 9 Drawing Figures

BONDED ASSEMBLY AND METHOD FOR OBTAINING SAME

BACKGROUND OF THE INVENTION

The present invention relates to sheet like metal-plastic laminates each of which has a first plastic layer and a second metal layer bonded to one side of the plastic layer. Preferably, the laminate has two metal layers, one of which is bonded to each side of the plastic layer.

Laminates of this type are known in the art and have a wide variety of highly advantageous uses. The material is relatively inexpensive and yet is a unique composite capable of taking on the various and infinite shapes of plastic, yet having strength and lightness particularly when the metal layer is a light metal such as aluminum. Composites of this type may be used in such diverse applications as building facing panels, building interior wall and ceiling panels, tunnel interiors, signs, kiosks, display cubes, desks, chairs and even consumer products, such as table tennis tops. It can be readily appreciated that for many of these applications it is highly desirable to join such metal-plastic laminates together at the edge portions thereof in order to provide a continuous, external metal layer which is characterized by good strength properties.

Methods for joining panels of this type include conventional joining procedures such as screwing, riveting or gluing. Each of these methods suffers from one or more significant disadvantages such as poor strength properties or external screws or rivets which detract from the esthetic appearance of the assembly.

Accordingly, it is a principal object of the present invention to provide a method for joining metal-plastic laminates and an improved, firmly joined assembly.

It is a still further object of the present invention to provide a method and assembly as aforesaid which is inexpensive and which enables the retention of an unobstructed, external metal face without the use of screws, rivets, pins or the like.

Further objects and advantages of the present invention will appear hereinbelow.

SUMMARY OF THE INVENTION

In accordance with the present invention, it has now been found that the foregoing objects and advantages may be readily obtained.

The method of the present invention comprises: providing two sheet like metal-plastic laminates each of which has a first plastic layer and a second metal layer bonded to one side of the plastic layer, each of said laminates having at least one layered edge portion. Preferably, the laminate includes two metal layers bonded on both sides of a plastic layer. The method of the present invention includes removing at least a portion of the plastic from said edge portions of each of said laminates abutting said second metal layer to provide a void in the edge portions of each of said laminates abutting said second metal layers. In accordance with the method of the present invention, an assembly is formed by placing said edge portions of said laminates adjacent one another so that said voids are in communication with each other, with a metal strip in said voids overlapping both of said laminates. The metal strip is then secured in each of said voids, as preferably by bonding to each of the abutting second metal layers, to provide a firmly joined assembly.

The firmly joined assembly of the present invention comprises: two sheet like metal-plastic laminates each of which has a first plastic layer and a second metal layer bonded to one side of the plastic layer, each of said laminates having at least one layered edge portion with said edge portions being adjacent to one another; a void in the plastic layer of each of said laminates abutting said second metal layers, with said voids communicating with each other and with a metal strip secured in said voids overlapping each of said second metal layers and preferably bonded thereto.

It can be readily seen that the method and assembly of the present invention is simple and easy to obtain and makes possible strong butt joints which are entirely smooth on the outside. Furthermore, as will be apparent from the ensuing specification, the method and assembly of the present invention are quite versatile and the described joint can be made to be extremely strong and practically invisible from the outside.

DETAILED DESCRIPTION OF PREFERRED EMBODIMENTS

Figure 1:
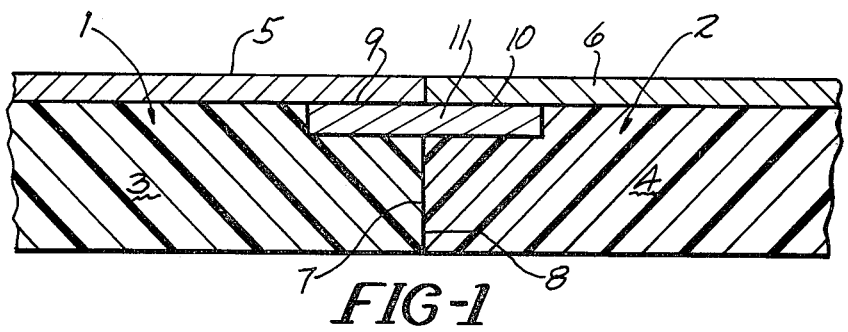
FIG. 1 is a cross section through two metal-plastic laminates of the present invention joined in accordance with the present invention.

FIG. 1 shows two sheet like metal-plastic laminates 1 and 2. Each laminate has a first plastic layer 3 and 4 and a second metal layer 5 and 6 bonded to one side of the plastic layer.

A wide variety of plastic materials may be utilized in the first plastic layer, such as polyethylene, polyvinyl chloride or a polyester generally. The thickness of the first plastic layer is not particularly critical, although the plastic layer generally will have a thickness varying from 0.01 to 1.0". Similarly, any desired metal sheet may be used for the second metal layer, preferably the second metal layer is a light, strong metal sheet such as aluminum. However, other metal sheets may, of course, be employed depending upon the particular use desired, such as magnesium, copper, steel or the like. Similarly, the thickness of the metal sheet is not particularly critical. Generally the metal sheet has sufficient thickness to provide the desired stiffness properties for the particular application. The metal sheet, for example, may generally have a thickness of from about 0.005 to 0.20". Also, the metal sheet may be colored or textured or provided with a desired surface appearance for the particular application. For example, if aluminum is used as the second metal layer, the surface thereof may be provided with a colored anodized surface layer for desired esthetic appearance.

As can be seen in FIG. 1, each metal-plastic laminate 1 and 2 has at least one layered edge portion 7 and 8. At least a protion of the plastic from the edge portions of each of the laminates abutting the second metal layer is removed to provide a void 9 and 10 in each of the laminates abutting each of the second metal layers 5 and 6.

Laminates 1 and 2 are then placed in edge to edge relationship to form an assembly by placing the edge portions 7 and 8 of each laminate 1 and 2 adjacent one another with voids 9 and 10 communicating with each other. A metal strip 11 is placed in the voids overlapping both laminates 1 and 2. The strip is then bonded to each of the abutting second metal layers 5 and 6 to provide a firmly bonded assembly. The metal strip 11 may be bonded to the abutting second metal layers 5 and 6 by any desired means, such as by means of an appropriate epoxy glue or spot welding. The metal strip 11 need not be continuous lengthwise, so that, for example, for convenience of insertion in a given embodiment, the metal strip 11 may comprise two abutting strips.

Figure 1A:
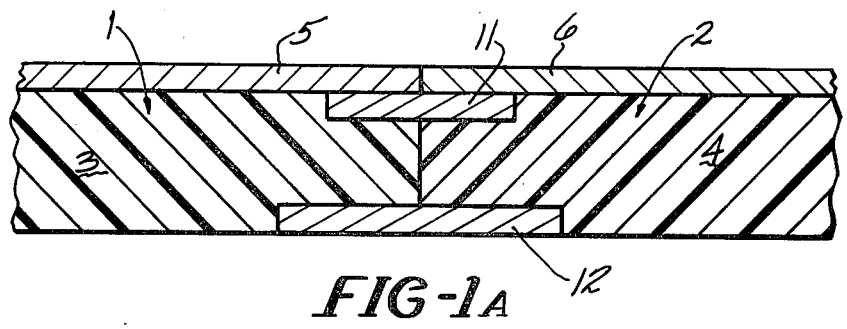
FIGS. 1A and 1B are similar cross-sectional views showing variations in the embodiment of FIG. 1.

If desired, as shown in FIG. 1A, further stabilization and strengthening of the joint can be achieved by means of an additional strip 12 affixed on the plastic side of the laminates 1 and 2. If desired, a portion of the plastic adjacent strip 12 can be removed as shown in FIG. 1A to provide a planar face on the plastic side of the laminate.

Figure 1B:
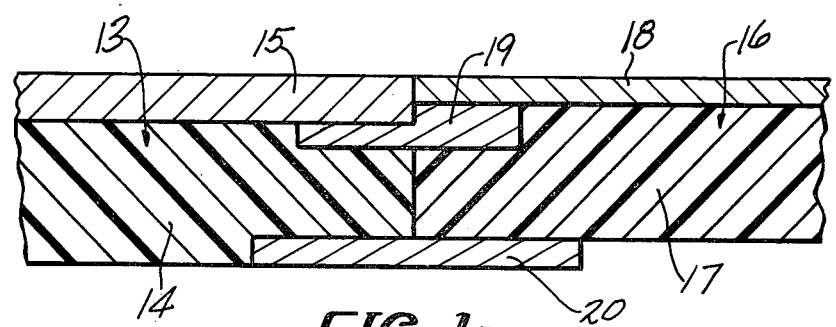

It can be seen from FIG. 1 that each metal-plastic laminate 1 and 2 preferably has the same thickness. This is not necessarily critical, however, and thickness of the laminates as well of components thereof will be dictated by the desired end use. For example, FIG. 1B illustrates a representative case where laminates having different thickness dimensions of the metal and/or the plastic sheets are to be joined. FIG. 1B bonds metal-plastic laminates 13 and 16, each of which have a first plastic layer 14 and 17, respectively, and a second metal layer 15 and 18, respectively, bonded to one side of the plastic layer. Each of the laminates have dissimilar thicknesses and each of the layers have dissimilar thicknesses. Two metal strips are shown, with a first strip 19 having a stepped configuration bonded to the abutting second metal layers, and a second reinforcing strip 20 affixed to the plastic side of laminates 13 and 16.

FIGS. 2 through 6 show variations in the method and assembly of the present invention wherein like numerals refer to like parts. In accordance with FIG. 2, each of the laminates 21 and 22 have two second metal layers 23 and 24 and 25 and 26 on both sides of first plastic layer 27 and 28, respectively. In accordance with the embodiment of FIG. 2, two voids 29 and 30 and 31 and 32 are provided in each of said laminates by removing at least a portion of the plastic from the edge portions 33 and 34 abutting each of said second metal layers. Two metal strips 35 and 36 are placed in both of said voids overlapping both of said laminates and the strips are bonded to each of the abutting second metal layers in a similar manner to that shown in FIG. 1.

An alternative embodiment is shown in FIG. 2B illustrating laminates having different thickness dimensions of the metal and/or plastic layers, wherein both laminates have two external second metal layers. Thus, metal-plastic laminates 37 and 41 each have a first plastic layer 40 and 44, respectively, and two second metal layers 38 and 39 and 42 and 43, respectively, on both sides of the first plastic layer. It will be readily seen that the two metal-plastic laminates differ considerably in thickness for all components, but that the external face is still planar. The bonding metal strips comprise a first strip 45 having a stepped configuration, and a second stepped and angled external reinforcing metal strip 46.

Figure 2:
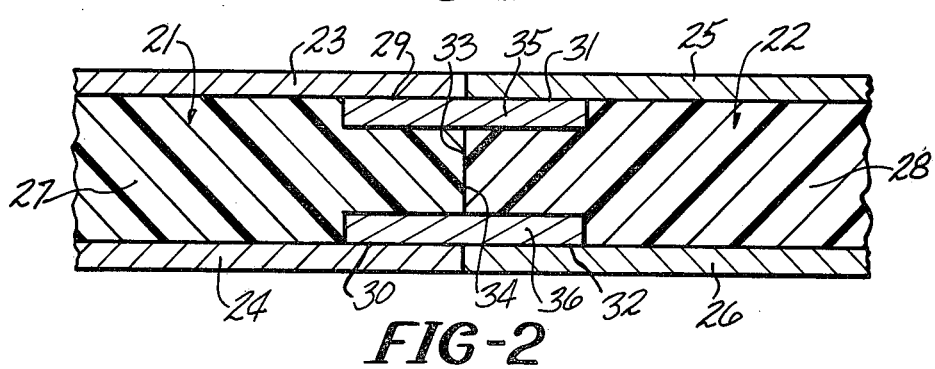
FIG. 2 is a similar cross-sectional view wherein each plastic layer has two metal layers bonded thereto.
Figure 2A:
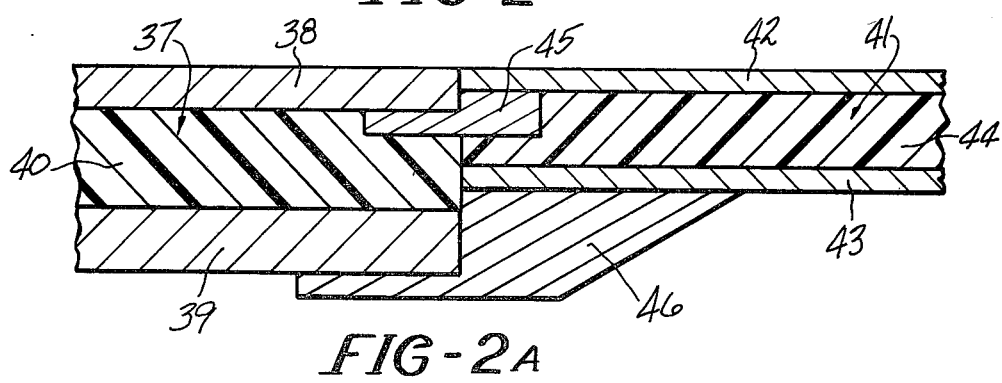
FIGS. 2A, 3, 4, 5, and 6 are cross-sectional views similar to FIG. 2 showing variations in the method and product of the present invention.
Figure 3:
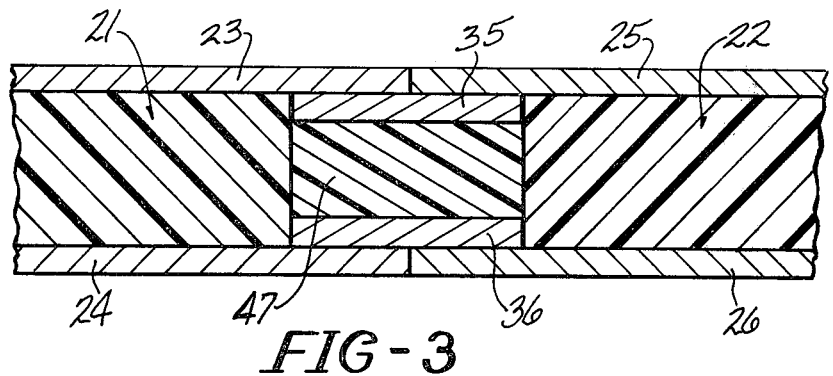
Figure 4:
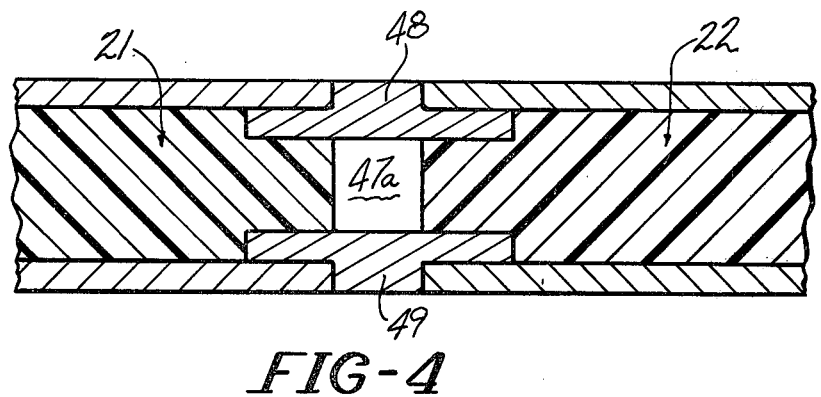

FIG. 3 is similar to FIG. 2 with the exception that the entire plastic thickness at each of said edge portions of each of said laminates is completely removed and a plastic spacer 47 is placed therein. This embodiment enables ease of bonding of metal strips 35 and 36 to the abutting second metal layers while still providing a good high strength joint. If desired, the plastic spacer may be bonded to the metal strips 35 and 36, such as by gluing.

It can be readily seen that all embodiments of the present invention have a smooth continuous external face of said second metal layers which does not mar the desirable esthetic appearance of the bonded assembly. In accordance with the embodiment of FIG. 4, metal strips 48 and 49 are provided which have a stepped configuration so that the smooth continuous external face includes a portion of said metal strip. This embodiment enables a large surface bonding area between the metal strips and the laminates with an even firmer bond. If desired, internal void 47a may be left in the bonded assembly.

Figure 5:
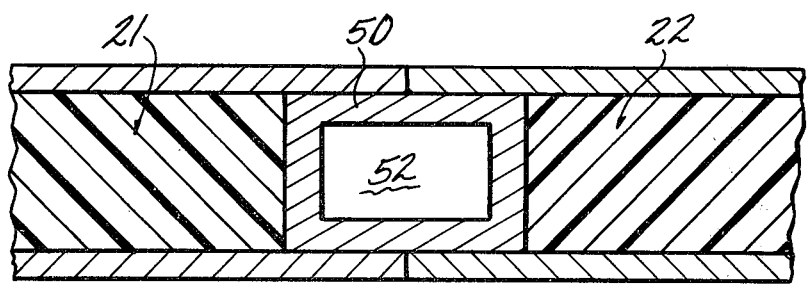
Figure 6:
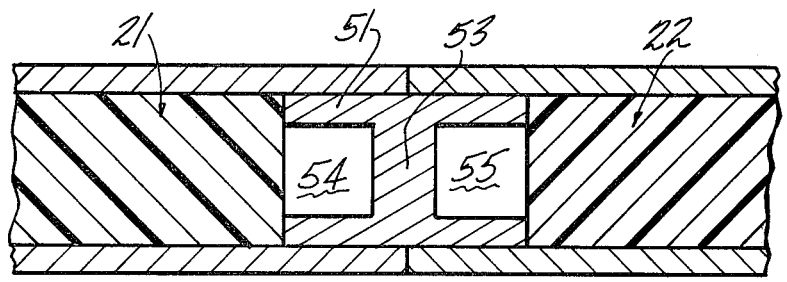

In accordance with FIGS. 5 and 6 continuous interconnected metal strips 50 and 51, respectively, are provided. Metal strip 50 has an annular configuration with a central annulus 52. Metal strip 51 has an H shaped configuration with a connecting strut 53 connected to legs 54 and 55.

Naturally, many other variations may be contemplated within the scope of the present invention. For example, metal strip 11 may be bonded to the abutting second metal layers 5 and 6 without the use of glue or spot welding by simply press fitting the metal strip in voids 9 and 10 which are slightly smaller than the metal strip. In this instance strip 11 need not be metal, but any rigid strip may be employed, such as a hard plastic strip. This will create a firm bond by compressing the plastic and avoids the use of glue or welding.

It can be readily appreciated that the joined assembly of the present invention readily achieves all of the advantages noted hereinabove. The assembly is firmly bonded without marring the external appearance thereof. In addition, the method is easy to perform and the joined article readily obtained.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for joining metal-plastic laminates which comprises: providing two sheet like metal-plastic laminates each of which has a first plastic layer and a second metal layer bonded to one side of the plastic layer, each of said laminates having at least one layered edge portion; removing at least a portion of the plastic from said edge portions of each of said laminates abutting said second metal layer to provide a void in the edge portions of each of said laminates abutting said second metal layer; forming an assembly by placing said edge portions of said laminates adjacent one another with said voids communicating with each other with a rigid strip in said voids overlapping both of said laminates; and securing said strip in each of said voids to provide a firmly joined assembly.

2. A method according to claim 1 wherein each of said sheet like metal-plastic laminates have substantially the same thicknesses.

3. A method according to claim 1 wherein each of said sheet like metal-plastic laminates have different thicknesses.

4. A method according to claim 1 including a support metal strip secured to both of said plastic layers on the side opposed to said second metal layers.

5. A method according to claim 1 with each of said laminates having two second metal layers bonded on both sides of said first plastic layer wherein two voids are provided in each of the edge portions of said laminates by removing at least a portion of the plastic from said edge portions abutting each of said second metal layers, metal strips are placed in both of said voids overlapping both of said laminates, and said strips are secured in each of said voids.

6. A method according to claim 5 including a plastic spacer between said metal strips.

7. A method according to claim 5 wherein said secured assembly has a smooth continuous external face of said second metal layers.

8. A method according to claim 7 wherein said secured assembly has a smooth continuous external face including a portion of said metal strip.

9. A method according to claim 8 wherein said metal strip has a stepped configuration.

10. A method according to claim 7 wherein said metal strip is continuous and interconnected.

11. A method according to claim 10 wherein said metal strip has a central annulus.

12. A method according to claim 10 wherein said metal strip has an H shaped configuration.

13. A firmly joined assembly comprising: two sheet like metal-plastic laminates each of which has a first plastic layer and a second metal layer bonded to one side of the plastic layer, each of said laminates having at least one layered edge portion, with said edge portions being adjacent to one another; a void in the plastic layer of each of said laminates abutting said second metal layers, said voids comminicating with each other, with a rigid strip secured in said voids overlapping each of said second metal layers.

14. An assembly according to claim 13 wherein said plastic layer has a thickness from 0.01 to 1.0" and wherein said metal layer has a thickness of from 0.005 to 0.02".

15. An assembly according to claim 13 wherein each of said laminates has two metal layers bonded on both sides of said first plastic layer with two voids in each of the edge portions of said laminates abutting each of said second metal layers, and with metal strips secured in each of said voids overlapping each of said second metal layers.

16. An assembly according to claim 15 wherein said bonded assembly has a smooth continuous external face of said second metal layers.

17. An assembly according to claim 15 wherein said smooth continuous external face includes a portion of said metal strip and wherein said metal strip has a stepped configuration.

18. An assembly according to claim 15 wherein said metal strips are continuous and interconnected.

19. An assembly according to claim 13 wherein said metal-plastic laminates have substantially the same thicknesses.

20. An assembly according to claim 13 wherein said metal-plastic laminates have different thicknesses.

21. An assembly according to claim 13 including a support metal strip secured to both of said plastic layers on the side opposed to said second metal layers.

* * * * *

UNITED STATES PATENT AND TRADEMARK OFFICE
CERTIFICATE OF CORRECTION

PATENT NO. : 4,156,054

DATED : May 22, 1979

INVENTOR(S) : Anatole M. Gurewitsch

It is certified that error appears in the above-identified patent and that said Letters Patent are hereby corrected as shown below:

In Column 2, line 63, change "protion" to read ---portion---.

In Column 6, line 2, claim 13, change "comminicating" to read ---communicating---.

In Column 6, line 8, claim 14, change '0.02"' to read ---0.20"---.

Signed and Sealed this

Twenty-eighth Day of August 1979

[SEAL]

Attest:

Attesting Officer

LUTRELLE F. PARKER

Acting Commissioner of Patents and Trademarks